(12) United States Patent
Sammons et al.

(10) Patent No.: US 9,433,143 B2
(45) Date of Patent: Sep. 6, 2016

(54) DROP SPREADER FOR POWDERED MATERIALS

(71) Applicants: David W. Sammons, Union City, TN (US); Donald Griffin Bruce, Whiteville, TN (US)

(72) Inventors: David W. Sammons, Union City, TN (US); Donald Griffin Bruce, Whiteville, TN (US)

( * ) Notice: Subject to any disclaimer, the term of this patent is extended or adjusted under 35 U.S.C. 154(b) by 23 days.

(21) Appl. No.: 14/528,330

(22) Filed: Oct. 30, 2014

(65) Prior Publication Data

US 2015/0129620 A1     May 14, 2015

Related U.S. Application Data

(60) Provisional application No. 61/902,001, filed on Nov. 8, 2013.

(51) Int. Cl.
| | |
|---|---|
| *A01C 15/02* | (2006.01) |
| *A01C 15/16* | (2006.01) |
| *A01C 7/02* | (2006.01) |
| *A01M 9/00* | (2006.01) |
| A01C 15/00 | (2006.01) |
| A01C 15/06 | (2006.01) |

(52) U.S. Cl.
CPC ............... *A01C 15/02* (2013.01); *A01C 7/02* (2013.01); *A01M 9/0084* (2013.01); *A01M 9/0092* (2013.01); *A01C 15/005* (2013.01); *A01C 15/007* (2013.01); *A01C 15/06* (2013.01)

(58) Field of Classification Search
CPC .... A01C 15/02; A01C 15/005; A01C 15/16; A01C 15/06; A01C 15/007; A01C 7/02; A01M 9/0092; A01M 9/0084

See application file for complete search history.

(56) References Cited

U.S. PATENT DOCUMENTS

| | | | | |
|---|---|---|---|---|
| 3,773,229 A * | 11/1973 | Gandrud | .................. | A01G 1/12 222/233 |
| 4,027,788 A * | 6/1977 | Parker | .................... | A01C 15/02 222/486 |
| 4,121,733 A * | 10/1978 | McRoskey | ............. | A01C 15/02 222/45 |
| 4,155,315 A * | 5/1979 | Dobbins | ................ | A01C 7/085 111/130 |
| 5,340,033 A * | 8/1994 | Whitell | ................ | A01C 15/007 239/661 |
| 6,321,954 B1 * | 11/2001 | Tabb | ........................ | A01C 3/06 222/623 |
| 6,705,552 B2 * | 3/2004 | Ellsaesser | ............ | A01C 17/003 222/620 |
| 7,040,556 B2 * | 5/2006 | Jones | .................... | A01C 17/001 222/610 |
| 7,530,509 B2 * | 5/2009 | Gaughan | .................. | A01C 3/06 222/623 |

\* cited by examiner

*Primary Examiner* — Frederick C Nicolas
(74) *Attorney, Agent, or Firm* — J. Peter Paredes; David G. Rosenbaum; Rosenbaum IP, P.C.

(57) ABSTRACT

A drop spreader apparatus generally includes a hopper configured to hold a spreadable material, the container comprises an opening extending linearly across a bottom of the hopper; a wheel and axle assembly comprise two wheels connected by a wheel axle, the wheels and axle configured to support the hopper; a de-bridging and dispensing assembly positioned above the opening of the hopper, the de-bridging and dispensing assembly comprise a de-bridger mechanism configured to sift the spreadable material and a de-bridging driver mechanically coupled to the wheel and axle assembly, the driver configured to drive the de-bridger mechanism using the rotation of the wheels.

13 Claims, 10 Drawing Sheets

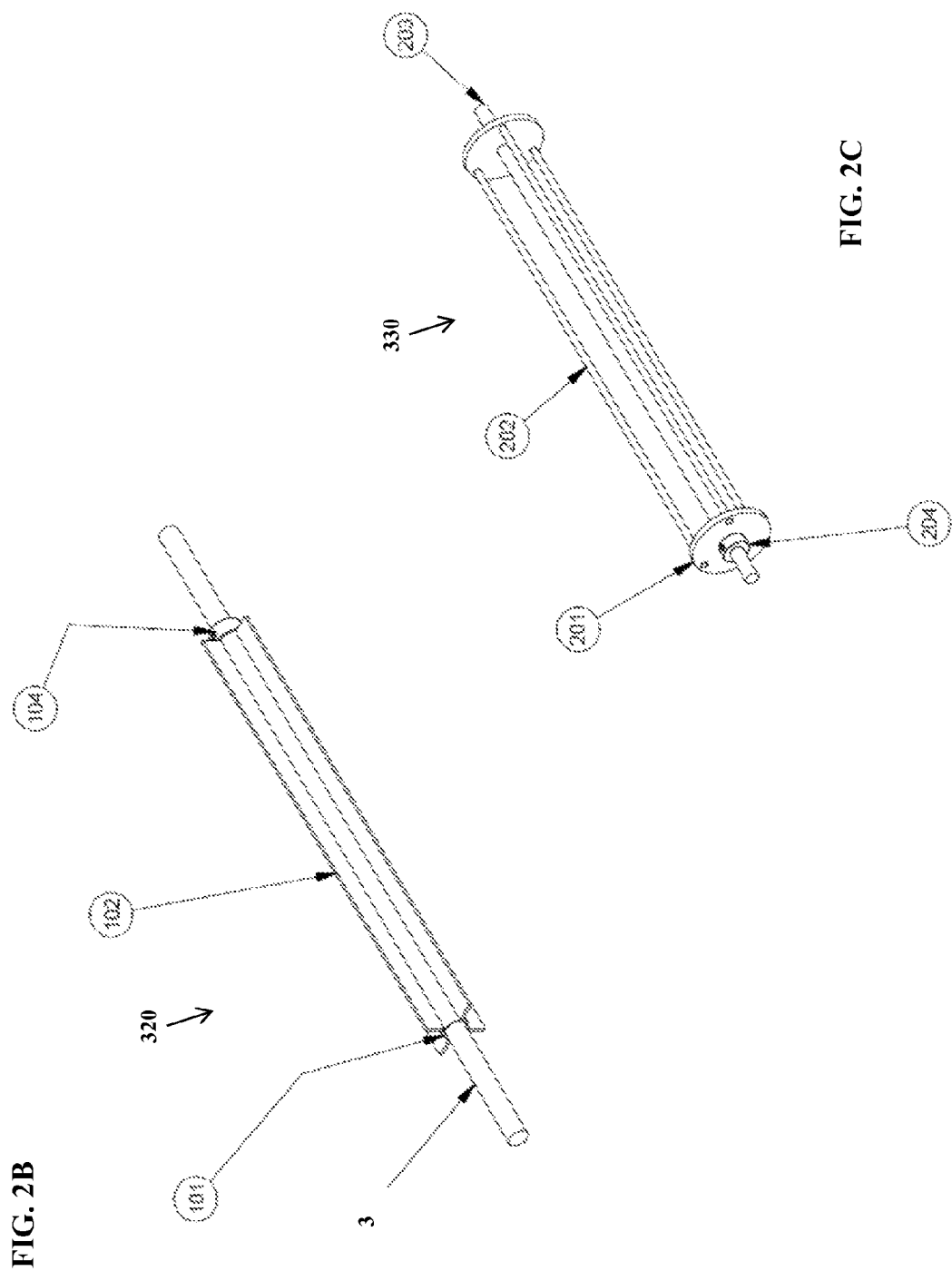

DROP SPREADER FOR POWDERED MATERIALS

CROSS-REFERENCE TO RELATED APPLICATIONS

Figure 1:
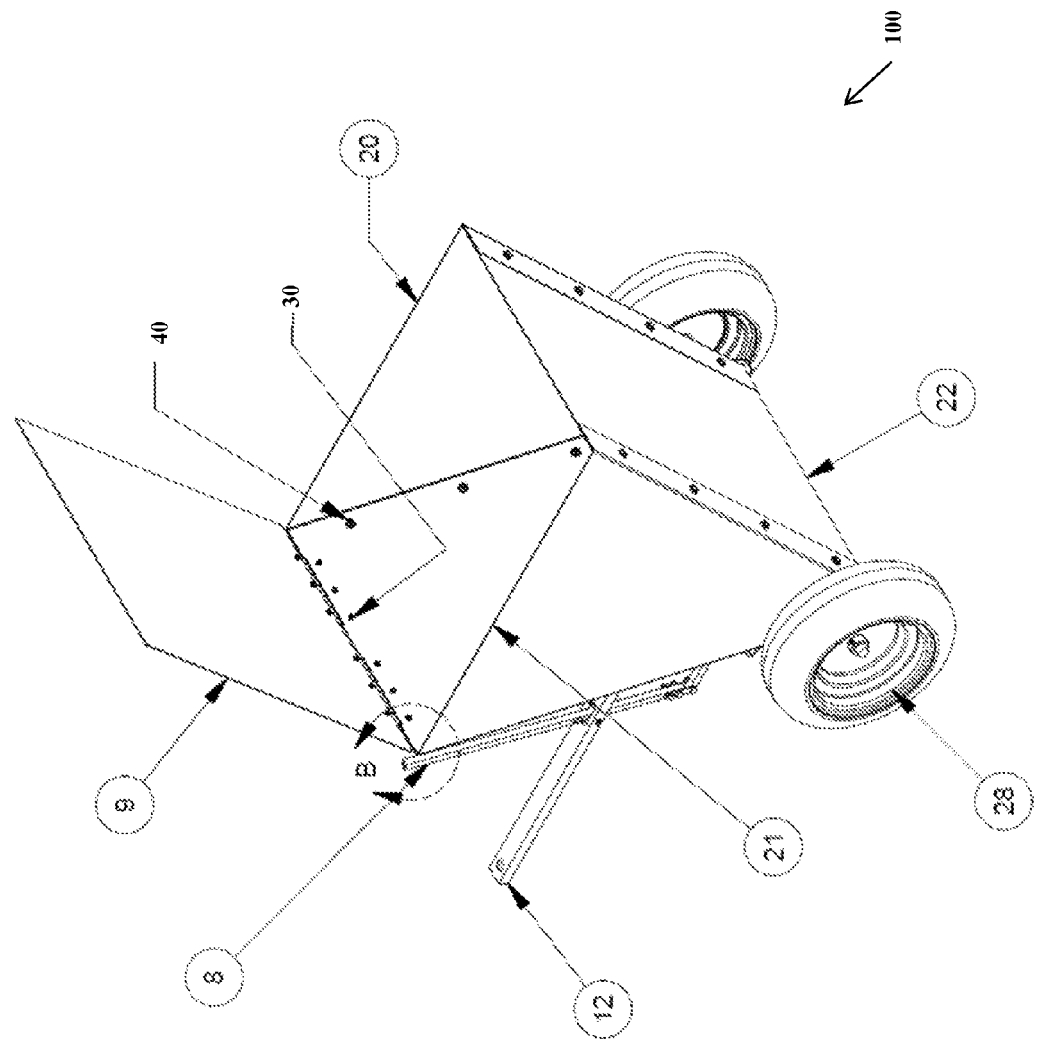

The application claims priority to U.S. provisional Application Ser. No. 61/902,001, filed Nov. 8, 2013, herein incorporated by reference in its entirety.

BACKGROUND

The application of fine powdered material (usually in the range of 2-15 microns), to a ground surface or any other flat surface exhibits a property of "bridging" as the powder flows from, or exits, a container or compartment. This property of bridging disrupts the desired even distribution of the powder in many commercial applications, such as for example the application of insecticides and fungicides. Drop spreaders are typically designed for the application of more dense material such as fertilizer and seed. This renders drop spreaders ineffectual for the application of fine powders since the powder material exits a drop spreader unevenly due to bridging. An uneven distribution does not allow for a controlled and repeatable application typically desired. At worst, bridging does not permit any distribution of the powder.

Centrifugal or spinner spreaders are alternatives to drop spreaders. However, spinner spreaders also exhibit a "bridging" of powder materials as the powder exits the compartment. Spinner spreaders are generally less desirable than drop spreaders since the fine material creates harmful airborne dust, if the powder exits the compartment at all. The airborne dust from spinner spreaders can endanger the health of the operator when harmful materials are applied. Drop spreaders, on the other hand, create a minimal amount of dust. While the disadvantage of airborne dust exhibited by spinner spreaders is avoided by using a drop spreader, the "bridging" property of finely ground material makes the drop spreader an ineffective delivery method for powder material such as diatomateous earth (DE), insecticides and fungicides.

There is a need in the art for an apparatus that may be used to spread powdered materials reliably, evenly, and safely.

SUMMARY OF THE INVENTION

Provided herein are systems, methods and apparatuses for a drop spreader for powdered materials. A drop spreader apparatus generally comprises: a hopper configured to hold a spreadable material, the container comprising an opening extending linearly across a bottom of the hopper; a wheel and axle assembly comprising two wheels connected by a wheel axle, the wheels and axle configured to support the hopper; a de-bridging and dispensing assembly positioned above the opening of the hopper, the de-bridging and dispensing assembly comprising a de-bridger mechanism configured to sift the spreadable material and a de-bridging driver mechanically coupled to the wheel and axle assembly, the driver configured to drive the de-bridger mechanism using the rotation of the wheels.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 1 is a perspective view of an example of a spreading apparatus configured to evenly spread powdered material;

FIG. 2A is a perspective view of the spreading apparatus of FIG. 1 with a side panel and a front panel removed to provide a view of an example implementation of a de-bridging and dispensing assembly;

FIG. 2B is a perspective view of an example of a rotating lower de-bridging and dispensing mechanism;

FIG. 2C is a perspective view of an example of a rotating upper de-bridging mechanism;

FIG. 2D is a perspective showing cutaway view A from FIG. 2C;

FIG. 3 is a side view of the spreading apparatus of FIG. 1;

FIG. 4 is a cross-sectional view of the spreading apparatus at Section A-A in FIG. 3;

FIG. 5 is a perspective view of a sliding door mechanism for opening and closing the opening of the container of the spreading apparatus;

FIG. 6 is a top view through the lid of the spreading apparatus of FIG. 1;

FIG. 7 is a bottom view of the spreading apparatus of FIG. 1;

FIG. 8 is a front view of the spreading apparatus of FIG. 1 with tires, rim, and lid removed.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof. It is noted that any dimensions or other implementation details are provided herein for purposes of illustrating example implementations and as such are not intended to be limiting in any way.

FIG. 1 is a perspective view of an example of a spreading apparatus 100 configured to evenly spread powdered material. While the spreading apparatus 100 may be configured to spread other spreadable material, the focus herein will be on the capability of evenly spreading powdered material that is subject to bridging effects when otherwise poured through the opening of a container. The spreading apparatus 100 in FIG. 1 includes a hopper 20 supported by a wheel and axle assembly 28. A lid 9 is provided, preferably attached to the top of the hopper 20 by at least one hinge 30, which rotates along angle B with respect to the top of the hopper 20. The lid permits the inclusion of spreadable material into the hopper 20 and to provide a cover to keep powdered material from becoming airborne dust during the use of the spreading apparatus 100. The spreading apparatus 100 includes a tow bar 12 to permit towing by a moving apparatus such as a tractor, a mower, a four-wheeler, or other similar types of moving apparatuses. In alternative embodiments, the spreading apparatus may include a pushing handle to permit pushing the spreading apparatus 100 during use. The hopper 20 may include a plurality of bolts 40 to connect a plurality of plates 21 and 22 to form the polygonal shape of the hopper 20. In one embodiment, the hopper 20 may form a trapezoidal shape as include a smaller diameter on the bottom of the hopper 20.

The spreading apparatus 100 includes a hopper opening 22 extending along the bottom of the hopper 20. A sliding door 6 (shown in FIGS. 2D and 5) is operably coupled with the hopper opening and the sliding door 6 is controlled using a pivot rod 8 to open or close the hopper opening 22. The hopper opening 22 is configured to permit dispensing of the powdered material from the hopper 20 along a line extending across the width of the hopper 20. The spreading apparatus 100 is configured to evenly spread powdered material by preventing bridging of the powdered material during dispensing. The spreading apparatus 100 includes a de-bridging and dispensing assembly (an example of which is described below in more detail with reference to FIGS. 2A-2D), which performs a sifting or stirring of the powdered material above the hopper opening 22 as the powdered material moves towards the hopper opening 22.

Figure 2A:
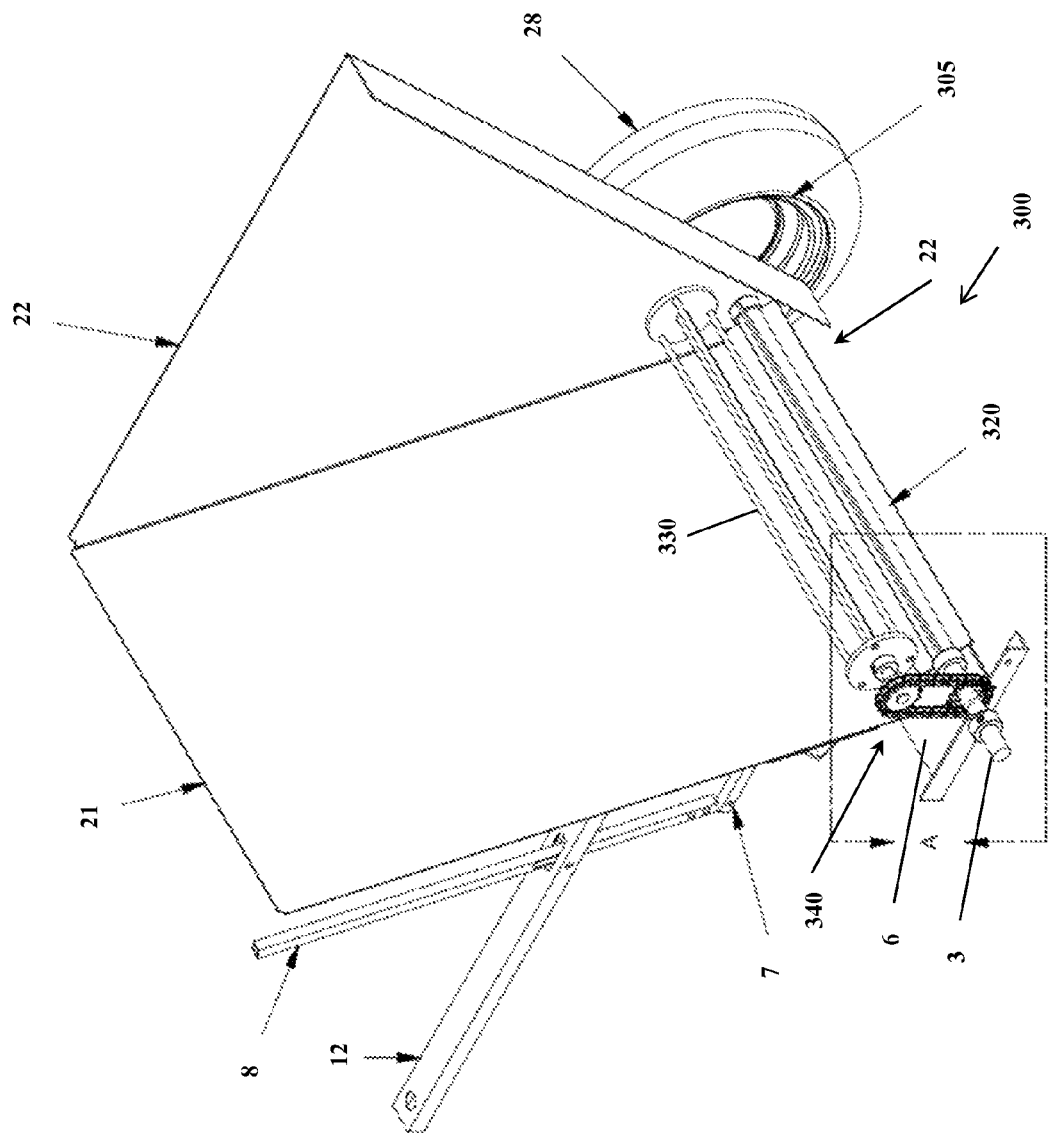

FIG. 2A is a perspective view of the spreading apparatus of FIG. 1 with a side panel 22 and a front panel 21 removed to provide a view of an example implementation of a de-bridging and dispensing assembly 300. The de-bridging and dispensing assembly 300 is mounted in a bottom portion of the hopper 20. The hopper opening 22 is shown covered by the sliding door 6, which is shown to be partially open in FIG. 2A. The sliding door 6 may be controlled to open or close the hopper opening 22 using the pivot rod 8 and a pushing rod 7. The user may push or pull on the pivot rod 8 to control the extent to which the hopper opening 22 is opened thereby controlling the flow of the powdered material through the hopper opening 8. In alternative embodiments, the extent to which hopper opening 22 is opened or closed may be controlled using motorized mechanisms or other mechanical means. The de-bridging and dispensing assembly 300 includes a lower de-bridging and dispensing mechanism 320 and an upper de-bridging mechanism 330 to dispense powdered material.

As shown in FIG. 2A, the lower de-bridging and dispensing mechanism 320 is rotatably engaged with a wheel axle 3 that connects a first tire 305 to a second tire (not shown in FIG. 2A) in the wheel and axle assembly 28 (in FIG. 1). The lower de-bridging and dispensing mechanism 320 is coupled on one end to a de-bridging driver mechanism 340, which is coupled to an end of the upper de-bridging mechanism 330. The lower de-bridging and dispensing mechanism 320 rotates when the tires 305 turn as the spreading apparatus 100 is pushed or pulled. When the lower de-bridging and dispensing mechanism 320 rotates, the de-bridging driver mechanism 340 rotates and drives the upper de-bridging mechanism 330 to also rotate. The configuration of the lower de-bridging and dispensing mechanism 320 provides a sifting or churning of the powdered material just as it is to be dispensed through the hopper opening 22. The lower de-bridging and dispensing mechanism 320 may also be configured to aid in dispensing the powdered material evenly through the hopper opening 22.

FIG. 2B is a perspective view of an example of a rotating lower de-bridging and dispensing mechanism 320. The rotating lower de-bridging and dispensing mechanism 320 includes a plurality of paddle members 102 fixedly attached to a paddle member support tube 101 fitted over the wheel axle 3. In one embodiment, the lower de-bridging and dispensing mechanism 320 may include four paddle members 102, at least two paddle members, or between 2 and 10 paddle members. A locking collar 104, or a suitable alternative, may be provided to lock the paddle member support tube 101 to the wheel axle 103. The paddle member support tube 101 spans across the entire horizontal length of the hopper 20 as shown in FIG. 2A. The paddle members 102 are configured to contact powdered material as the paddle members 102 are rotated so as to disrupt any bridging while spreading the powdered material evenly along the length of the paddle members 102 thereby distributing the powdered material evenly across the width of the bottom of the hopper 20 just prior to dispensing the powdered material through the hopper opening 22. The paddle members 102 are shown to have a flat configuration; however, the paddle members 102 may have a curved configuration for dispensing powdered material.

FIG. 2C is a perspective view of an example of a rotating upper de-bridging mechanism 330. The rotating upper de-bridging mechanism 330 includes a plurality of rod members 202 attached to at least two circular end plates 201. In one embodiment, the rod members are attached around the circumference or perimeter of the circular end places. The center of the circular end plates 201 are attached to a shaft 203 with a locking collar 204 or a suitable alternative. The rod members 202 span across the entire horizontal length of the hopper 20 as shown in FIG. 2A. The rotating upper de-bridging mechanism 330 is configured to sift or churn powdered material at a position above the lower de-bridging and dispensing mechanism 320 to disrupt any bridging as the powdered material flows towards the hopper opening 22. The rotation of the shaft 203 and the circular plates 202 rotate the rod members 202 in a circular fashion to sift or churn powdered material that flows through the rotating upper de-bridging mechanism 330 by way of gravity. The rotating upper de-bridging mechanism 330 is rotatably coupled to the axle 3 by way of the de-bridging driver mechanism 340.

Figure 2D:
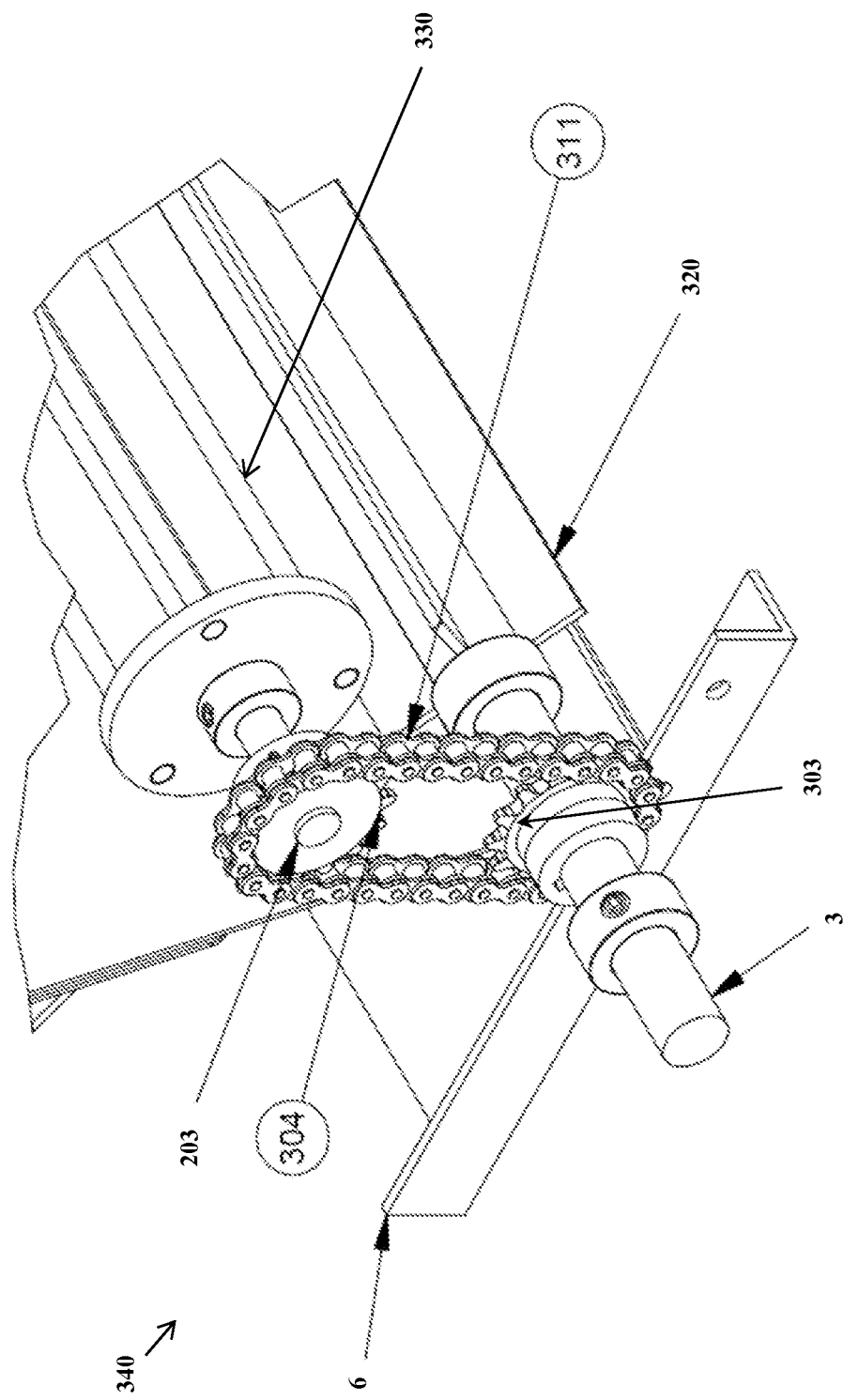

FIG. 2D is a perspective showing cutaway view A in FIG. 2C illustrating an example de-bridging driver mechanism 340. The example de-bridging driver mechanism 340 shown in FIG. 2D includes at least one chain 311, and at least two sprockets 303 operably engaged to the lower de-bridging drive mechanism 320 at the ends of the axle 3, and at least two sprockets 304 operably engaged to the upper de-bridging mechanism 330 at the ends of the shaft 203. The rotating motion of the lower de-bridging and dispensing mechanism 320 is driven by the wheels and axle 3 turning, which is transferred to the sprocket 303 engaged to the lower de-bridging and dispensing mechanism 320 causing it to rotate. The rotation of the sprocket 303 is transferred to the chain 311, which causes the sprocket 304 engaged to the upper de-bridging mechanism 330 to rotate by rotating the shaft 203. The sprockets 304 may be fixed in position using any suitable fixing mechanism such as for example a set screw in a locking collar 310.

It is noted that the lower de-bridging and dispensing mechanism 320 and upper de-bridging mechanism 330 described above with reference to FIGS. 2A-2D are examples of mechanisms that may be used to provide a sifting or churning of the powdered material to prevent bridging as the powdered material is dispensed. For example, the lower de-bridging and dispensing mechanism 320 includes paddle members as shown in FIG. 2B; however, any suitable sifting mechanism may be used, such as a corrugated shaft, turbine, and the like. Also, for example, the upper de-bridging mechanism 330 includes three rod members; however, any suitable number of rod members may be used. In addition, the chain and sprockets de-bridging driver mechanism is but one example of a de-bridging driver mechanism. Other driving mechanisms may be used to drive the rotation of the de-bridging and dispensing mechanisms, such as driven by a belt, turbine, and the like.

Figure 3:
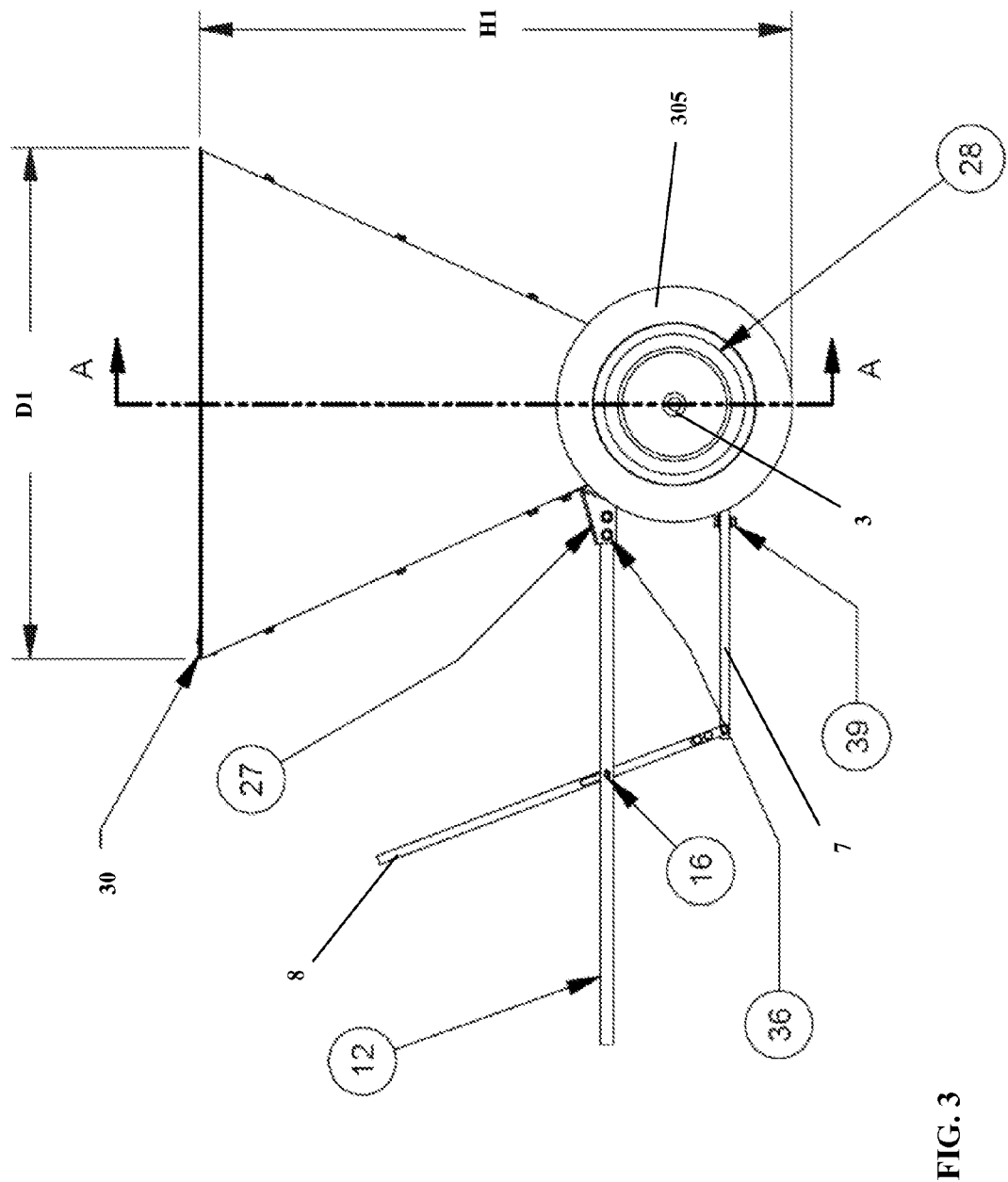

FIG. 3 is a side view of the spreading apparatus 100 of FIG. 1 illustrating the hopper 20, the tow bar 12, the pivot rod 8, and the wheel and axle assembly 28. The spreading apparatus 100 in FIG. 2 includes a hopper 20 that is shaped as an inverted triangle or trapezoid to guide powdered material towards the bottom of the hopper 20. The top of the hopper 20 may include a diameter opening of D1 and the hopper 20 may include a height H1 from the bottom of the tire 305 to the top of the hopper 20. In one embodiment, H1 is greater than D1 such as facilitate the downward movement of the powdered material. The center of the tires 305 are connected to the axle 3, which runs through the structure of the bottom of the hopper 20 engaging with the lower de-bridging and dispensing mechanism 320, described above with reference to FIGS. 2A-2D. The spreading apparatus 100 may be pulled using the tow bar 12 attached by any suitable means to the hopper 20. In one embodiment, the tow bar 12 may be connected to the back of the hopper 20 by way of a tongue receiver 27 that allows the end of the tow bar 12 to rotate up and down with respect to the hopper 20. The tongue receiver 27 operates similar to a hinge and is operably connected to the tow bar 12 by way of a bolt or pin 36. The tow bar 12 may include a slot at 16 that may be used as a pivot point for the pivot rod 8 by way of a pin. The pivot point 360 enables the user to control the extent to which the sliding door 6 opens or closes the hopper opening 22 (not shown). The pivot rod 8 is operably coupled to a pusher rod 7 that connects to the sliding door 6 (not shown) by way of a bolt 39.

Figure 4:
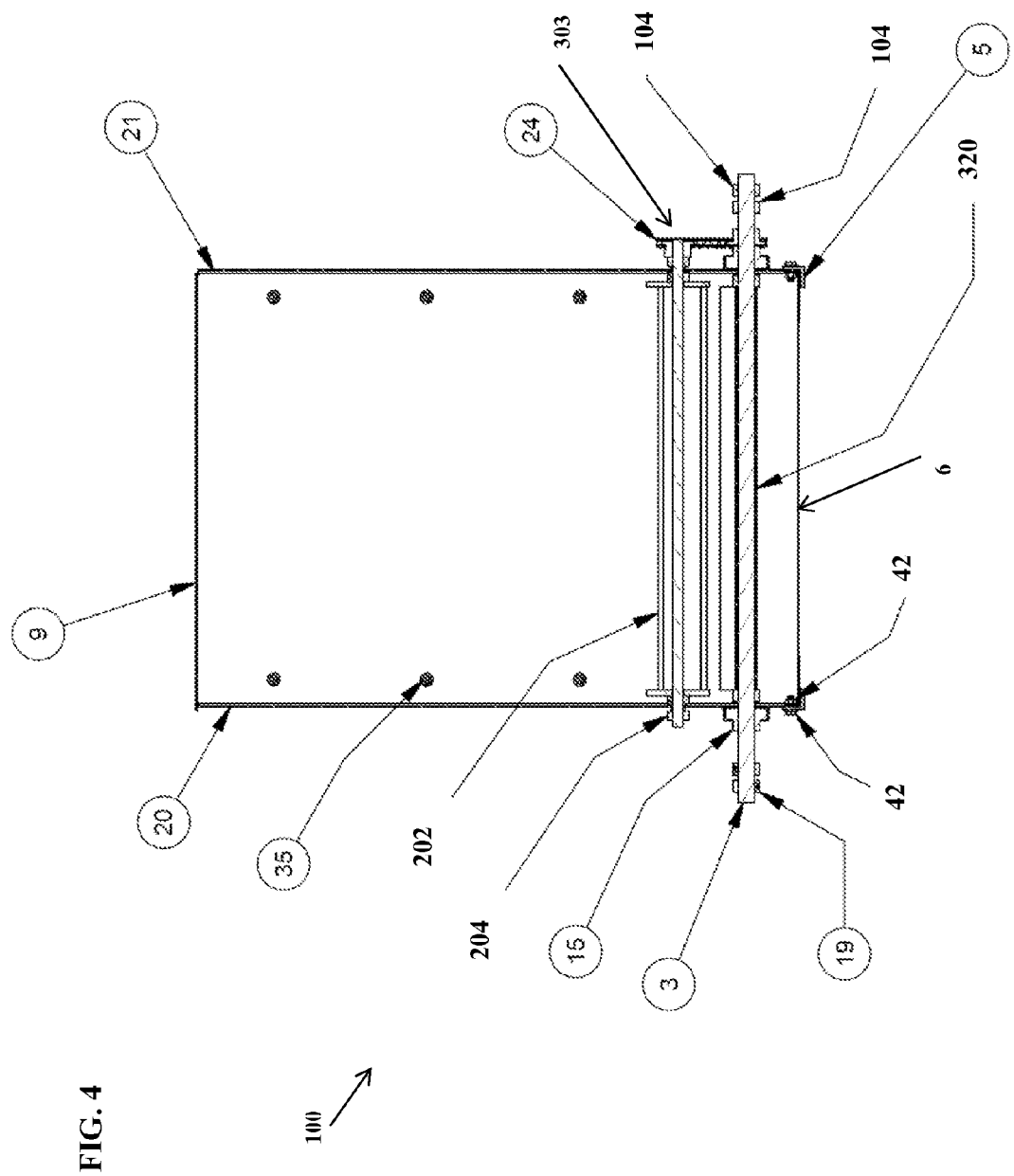

FIG. 4 is a cross-sectional view of the spreading apparatus at Section A-A in FIG. 3. FIG. 4 is a view from the front of the spreading apparatus 100. FIG. 4 shows the lid 9 at the top of the hopper 20, the hopper 20, the axle 3, the chain 24, the lower de-bridging and dispensing mechanism 320, and the upper de-bridging mechanism 330. It is noted that the tires 305 are not illustrated for clarity. FIG. 4 shows the axle 3 extending through the bottom of the hopper structure to support the paddle member support tube to which the paddle members are attached. The chain 24 couples the lower de-bridging and dispensing mechanism 320 and the upper de-bridging mechanism 330 to transfer the rotating motion of the axle 3 to each mechanism. The collar 204 on the upper de-bridging mechanism 330 secures the end plates in place. The lower de-bridging and dispensing mechanism 320 may be fitted with two collars 104. The axle 6 may include an axle bearing 15 to allow rotational movement of the axle 6 relative to the hopper. The sliding door 6 may be connected to L brackets 5 by way of bolts 42 to allow the sliding door 6 to move in straight line, as further explained below.

Figure 5:
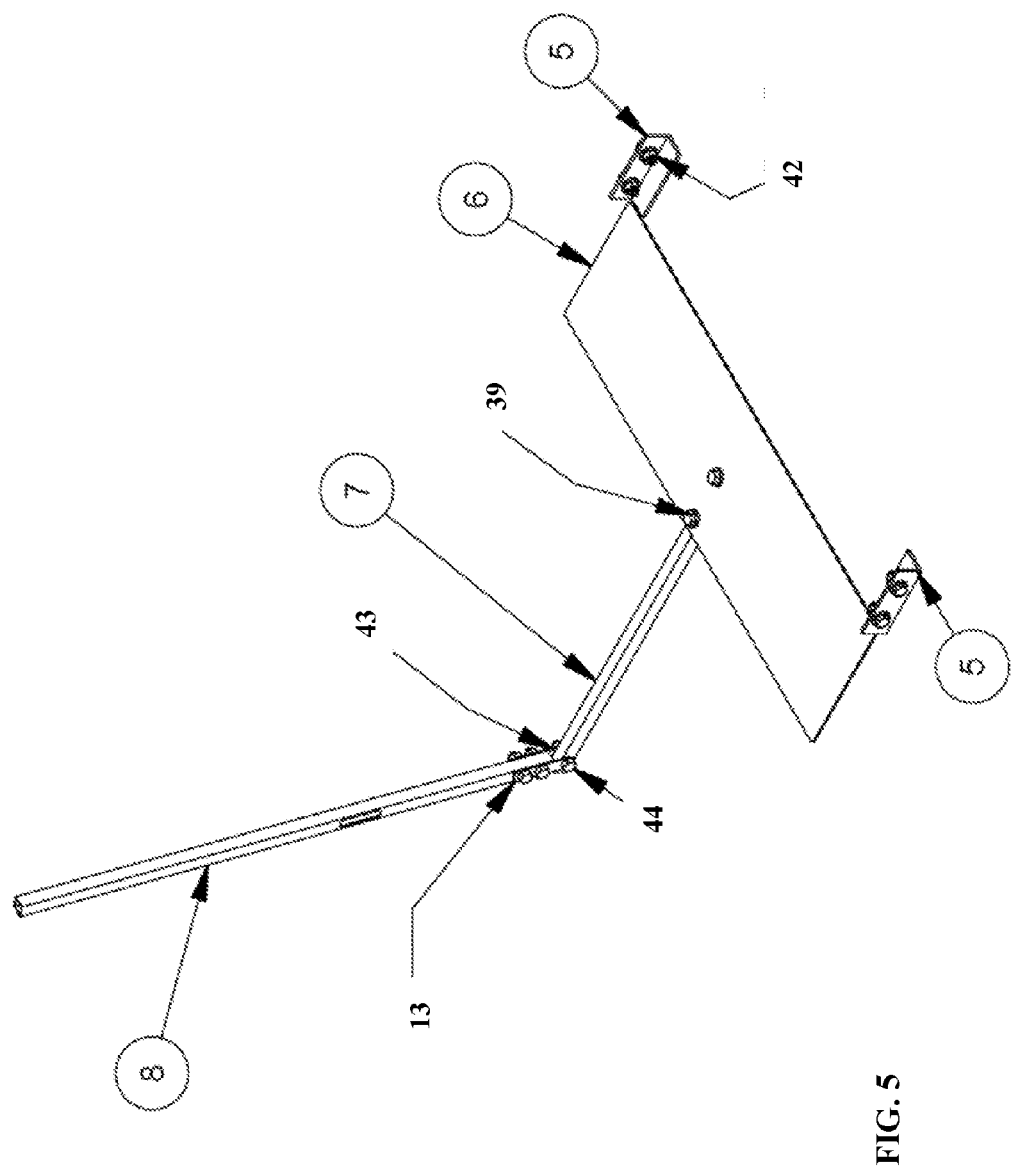
Figure 6:
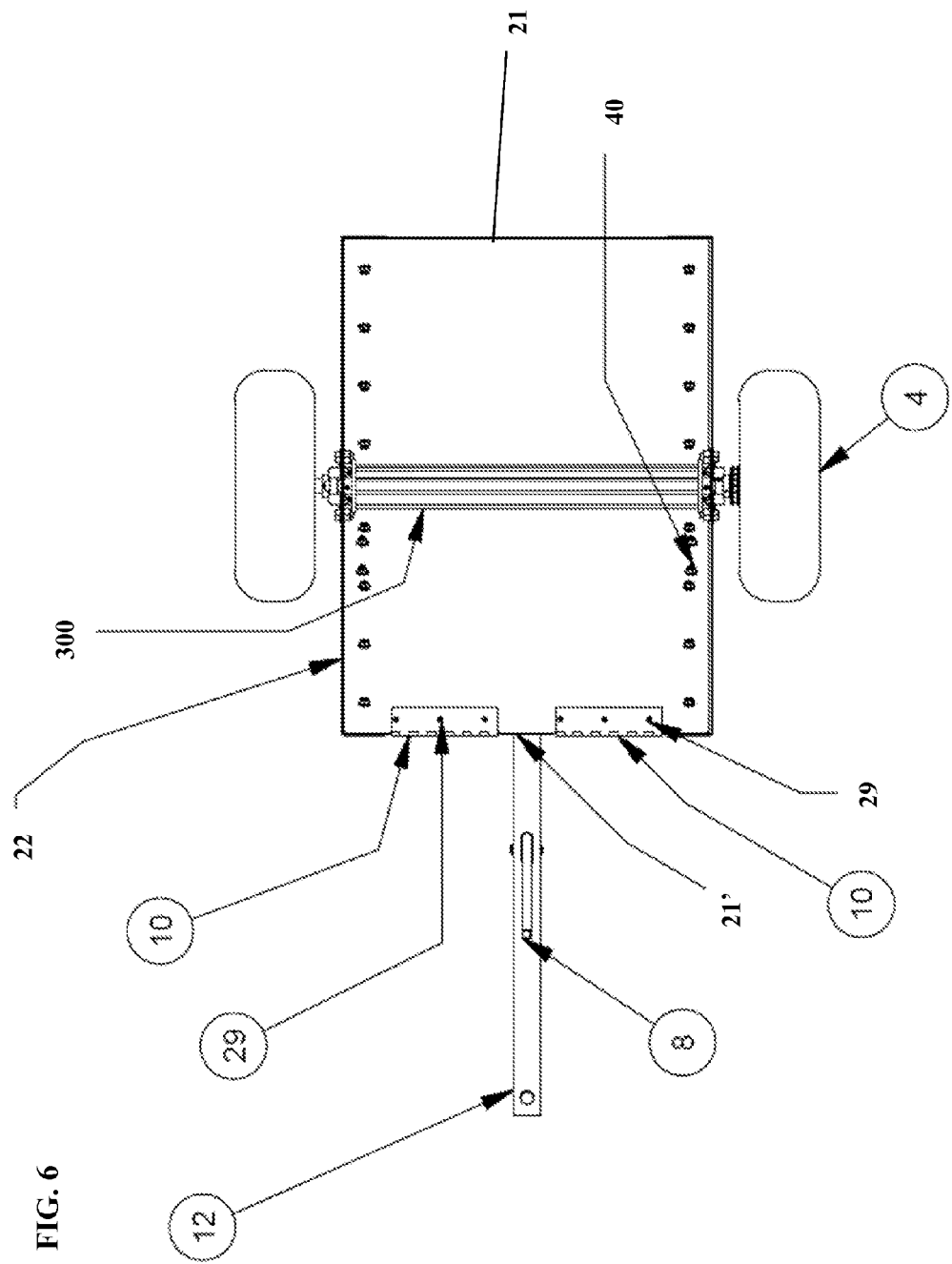
Figure 7:
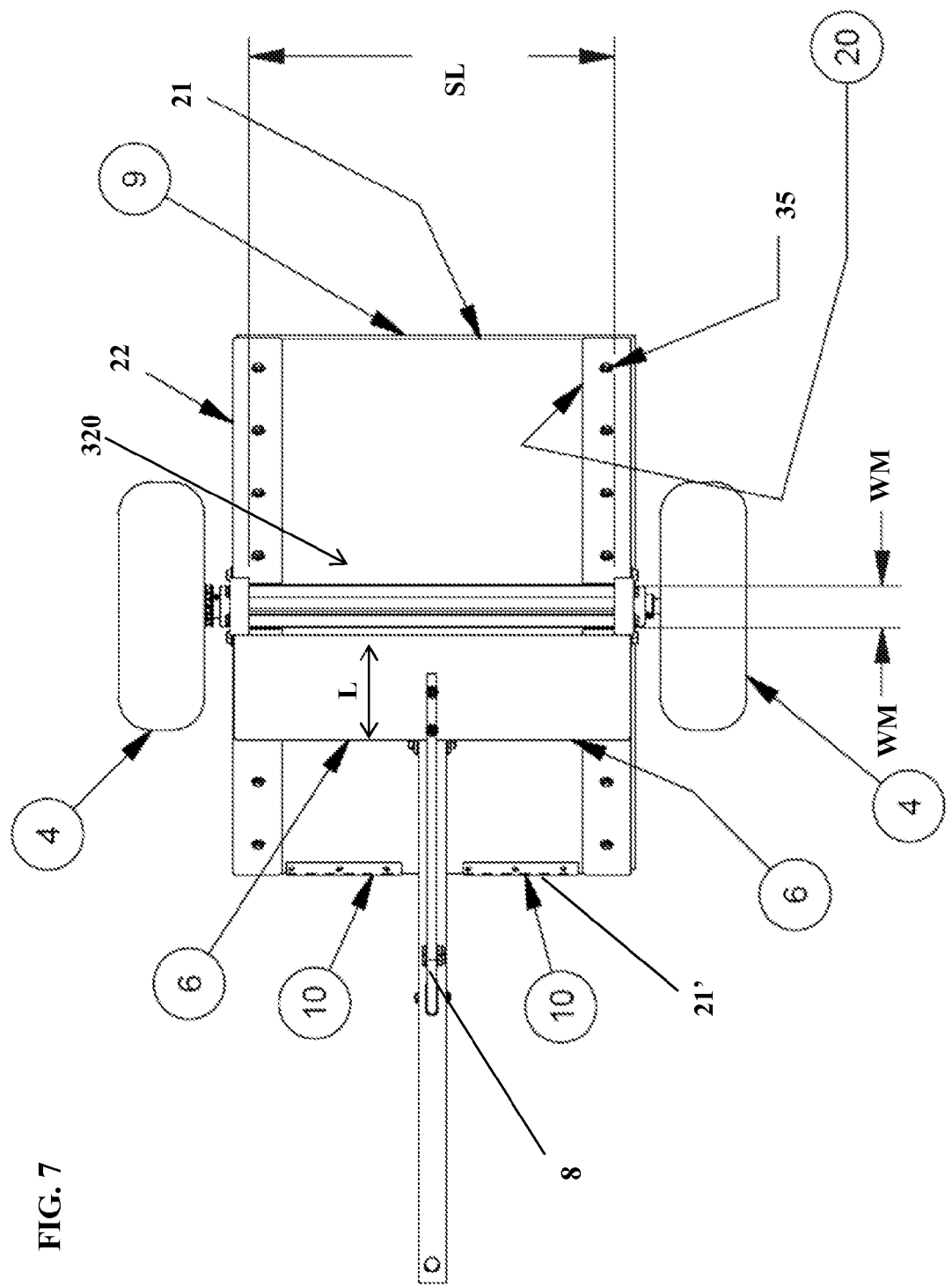
Figure 8:
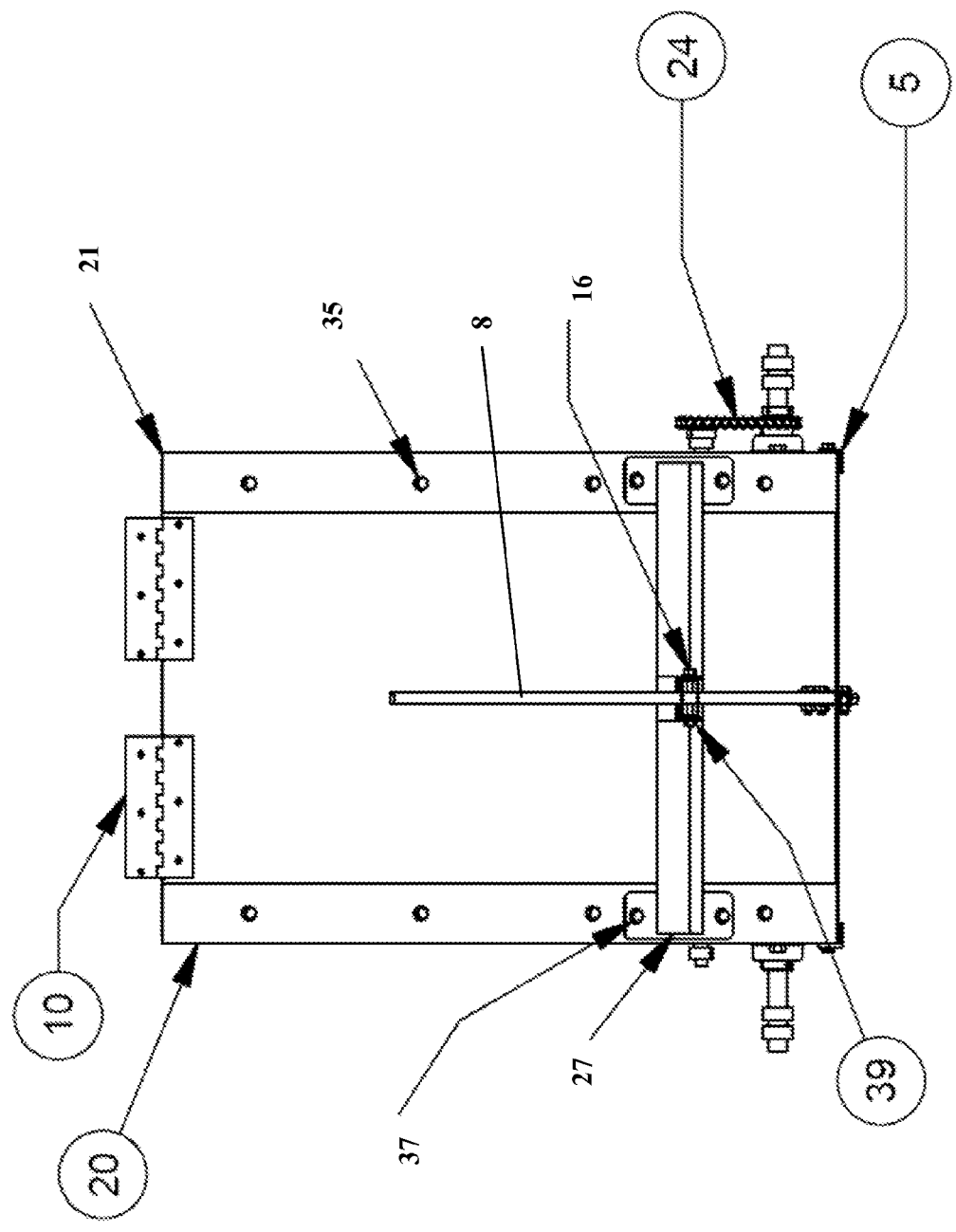

FIG. 5 is a perspective view of a sliding door mechanism for opening and closing the opening of the container of the spreading apparatus. The sliding door mechanism is shown in FIG. 5 isolated from the rest of the structure of the spreading apparatus. The sliding door mechanism includes the pivot rod 8, the pushing rod 7, the sliding door 6, and L brackets 5. The pivot rod 8 is configured in the spreading apparatus to pivot at pivot point 13 when pushed and pulled at the top end of pivot rod 8. The pivot point 13 may consist of a bolt 44 and pin 43. The pivot point 13 permits the pivot rod 8 to push or pull the pushing rod 7 laterally parallel to the ground. The pushing rod 7 is coupled to the sliding door 6 by way of a bolt 39, which is pushed or pulled in response to the motion of the pushing rod 7. The sliding door 6 slides along the L brackets 5, which support the sliding door 6 at a position proximal to the hopper opening.

FIG. 6 is a top view through the lid of the spreading apparatus of FIG. 1. FIG. 6 provides an overhead view into the hopper 20 formed by a hopper back plate 21 and a hopper front plate 21' and connected by two side plates 22. The hopper plates 21 and 21' may be connected to the two side plates 22 by way of a plurality of bolts 40. The de-bridging and dispensing assembly 300 extends across the hopper 20 between the tires 4. The lid may be attached to the hopper front plate 23 using at least two hinges 10 secured to the back plate 21' by way of bolts or nuts 29. FIG. 6 also shows the tow bar 12 coupled with the pivot rod 8, where the two bar extends from the hopper front plate 21'.

FIG. 7 is a bottom view of the spreading apparatus of FIG. 1. FIG. 7 shows the door plate 6 positioned under the front plate 21' of the hopper 20. The sliding door plate 6 may be moved laterally (illustrated by arrow L) using the pivot rod 8 as described above with reference to FIG. 5. The sliding door plate 6 may be moved to open or close by a desired amount the hopper opening indicated generally at SL. The hopper opening 22 is shown in an open state to reveal the lower de-bridging and dispensing mechanism 320 inside the hopper 20. The side plates 22 may be further secured to the front and back plates 21, 21' by way of side plates 20 and bolts 35. The lower de-bridging and dispensing mechanism 320 may a width of WM to be suited to the powered material to be dispensed and dispersed therewith.

FIG. 8 is a front view of the spreading apparatus of FIG. 1 with tires, rim, and lid removed. FIG. 8 shows the hinges 10 for holding the lid along the top edge of the hopper 20. FIG. 8 provides a view of the pivot rod 8 secured to the pusher rod 7 by way of by way of a bolt 39 and slot 16. The chain 24 operably coupled to the sprockets. The L brackets 5 used to support the door plate 6; and the tongue receiver 27 for receiving the tow bar 12. The tongue receiver 27 may be secured to the front plate by way of bolts 37.

It is noted that the examples illustrated in the figures herein depict an example of an implementation that is intended to be towed using the tow bar 12 or a similar suitable mechanism. Such an implementation involves pulling the spreading apparatus using a tractor, lawn mower, or four wheeler. An example of use in such an implementation includes applying powders such as diatomaceous earth ("DE"), insecticide, etc. in poultry broiler houses in band applications on top of the bedding under feed lines, drinker lines and/or along the exterior wall footer or other places where insects hide and feed. It is envisioned that fixtures or attachments (such a light disk or harrow) can be added to the rear of the drop spreader to assist in incorporating the dispensed insecticide into the poultry litter or bedding. The dispensing of powder with the spreading apparatus close to the footer may be facilitated using an offset perpendicular to and from the center of the pulling means (small tractor or four wheeler). The spreading apparatus may include an offset attachment that is constructed with hole spacing so that it is firmly fixed to the drawbar and has holes approximately six inches apart extending at right angles from the center of the tractor or four wheeler drawbar. The pull spreading apparatus may include a tongue attached with a swivel hitch. The swivel hitch may be attached to a hole extending from the tractor or four wheeler drawbar to position the drop spreader permitting insecticide powder to drop near the wall footer. Another of use of the pull type spreading apparatus is to apply powdered insecticide onto yard surfaces such as home or business lawns or golf course greens and fairways.

In another example implementation, the spreading apparatus may include a handle instead of a tow bar. The handle may be pushed by hand of a walking person and enable the de-bridging assembly to dispense insecticide onto small or hard to access areas. For example, the hand pushed type spreading apparatus may be used around flower beds, under low branches of small trees or other confined area such as gardens. Another example application of the spreading apparatus may be in breeder or layer poultry houses where insecticide is to be applied through slats underneath roost areas of poultry. This area is inaccessible to a small tractor or other mechanized means of pulling the drop spreader. The insecticide is typically applied by hand by a person who dispenses (throws) powder with a hand scoop or other manual means; thereby, creating powder dust which can be dangerous to health when breathed by the person. The insecticide is expected to drop through the slats supported over the inaccessible manure where insects and (fly) larvae reside. Use of the push type of spreading apparatus powers the rotation of the incorporated de-bridging and dispensing assembly and drops powder through the slats onto the manure without creating excessive dust. Some powdered material may fall on top of the slat instead of between the space between the slats. In an example implementation of the spreading apparatus, a fixture is attached to the back of the drop spreader that rakes or brushes off the insecticide into the slat opening as the drop spreader travels across the slats.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A drop spreader apparatus comprising:

a hopper configured to hold a spreadable material in a container, the container comprising an opening extending linearly across a bottom of the hopper;

a wheel and axle assembly comprising two wheels connected by a wheel axle, the wheels and axle configured to support the hopper;

a de-bridging and dispensing assembly positioned above the opening of the hopper, the de-bridging and dispensing assembly comprising a de-bridger mechanism configured to sift the spreadable material and a de-bridging driver mechanically coupled to the wheel and axle assembly, the driver configured to drive the de-bridger mechanism using the rotation of the wheels, where the de-bridging and dispensing assembly comprises:

a lower rotating de-bridging and dispensing mechanism comprising at least one paddle attached to a paddle support coupled to a rotatable shaft extending across the hopper opening, the rotatable shaft configured to rotate in response to the rotation of the axle;

an upper rotating de-bridging mechanism positioned above the lower rotating de-bridging and dispensing mechanism comprising at least one de-bridging rod supported on a periphery of two disks mounted on opposite ends of the rotatable shaft extending through the center of the upper rotating de-bridging mechanism.

2. The drop spreader apparatus of claim 1 where the de-bridging driver includes a chain disposed around a first sprocket engaged with the lower rotating de-bridging and dispensing mechanism and a second sprocket engaged with the upper rotating de-bridging mechanism, the chain configured to rotate the upper rotating de-bridging mechanism via the sprockets when the lower rotating de-bridging and dispensing mechanism is rotated by the wheel axle assembly.

3. The drop spreader apparatus of claim 1 further comprising a tow bar for pulling the apparatus.

4. The drop spreader apparatus of claim 1 further comprising a handle for pushing the apparatus.

5. The drop spreader apparatus of claim 1 further comprising a sliding door mechanism for controlling the size of the hopper opening.

6. The drop spreader apparatus of claim 5 where the sliding door mechanism comprises:

a pivot rod oriented generally vertically and configured to pivot at a pivot point along the length of the pivot rod;

a pushing rod oriented generally horizontally and coupled to an opposite end of the pivot rod; and a door plate extending from the pushing rod in parallel with the ground, where the pivot rod is coupled to the pushing rod and moved in parallel to the ground when the pivot rod is pushed or pulled.

7. The drop spreader apparatus of claim 5, wherein the hopper comprising a hopper back plate, a hopper front plate, and at least two side plates connecting the hopper back plate and the hopper front plate; a lid attached to the hopper front plate; and a tow bar extends from the hopper front plate.

8. The drop spreader apparatus of claim 5, further comprising a locking collar disposed on the rotatable shaft to lock the paddle support to the wheel axle.

9. The drop spreader apparatus of claim 5, wherein the at least one paddle includes a flat configuration or a curved configuration.

10. The drop spreader apparatus of claim 5, wherein the rotation of the rotatable shaft and the two disks rotate the at least one de-bridging rod in a circular fashion.

11. The drop spreader apparatus of claim 5, further comprising a de-bridging driver mechanism to rotate the upper de-bridging mechanism by way of the wheel axle, wherein the de-bridging driver mechanism comprises at least one chain, and at least two sprockets operably engaged to the lower de-bridging drive mechanism at the ends of the wheel axle, and at least two sprockets operably engaged to the upper de-bridging mechanism at the ends of the rotatable shaft.

12. The drop spreader of claim 3, wherein the tow bar is connected to the hopper by a tongue receiver that allows the end of the tow bar to rotate up and down with respect to the hopper.

13. The drop spreader of claim 12, wherein the tow bar includes a slot and a pin used a pivot point for a pivot rod.

* * * * *